United States Patent
Seiz et al.

(10) Patent No.: US 9,126,211 B2
(45) Date of Patent: Sep. 8, 2015

(54) ROTARY ATOMIZER COMPRISING AN ATOMIZER BELL AND A RETAINER

(75) Inventors: Bernhard Seiz, Lauffen (DE); Frank Herre, Oberriexingen (DE); Michael Baumann, Flein (DE); Harry Krumma, Bonnigheim (DE); Hans-Jurgen Nolte, Besigheim (DE); Manfred Michelfelder, Steinheim (DE); Rainer Melcher, Oberstenfeld (DE); Timo Beyl, Besigheim (DE); Stephan Scholl, Herzogenbuchsee (CH)

(73) Assignee: Durr Systems GmbH, Bietigheim-Bissingen (DE)

( * ) Notice: Subject to any disclaimer, the term of this patent is extended or adjusted under 35 U.S.C. 154(b) by 643 days.

(21) Appl. No.: 13/386,790

(22) PCT Filed: Jul. 26, 2010

(86) PCT No.: PCT/EP2010/004569
§ 371 (c)(1),
(2), (4) Date: Jan. 24, 2012

(87) PCT Pub. No.: WO2011/009641
PCT Pub. Date: Jan. 27, 2011

(65) Prior Publication Data
US 2012/0132726 A1 May 31, 2012

(30) Foreign Application Priority Data

Jul. 24, 2009 (DE) .................... 10 2009 034 645
Mar. 30, 2010 (DE) .................... 10 2010 013 414
May 5, 2010 (EP) .................... 2010/002764

(51) Int. Cl.
B05B 3/10 (2006.01)
B05B 1/00 (2006.01)
(Continued)

(52) U.S. Cl.
CPC ............ *B05B 3/1042* (2013.01); *B05B 3/1064* (2013.01); *B05B 5/0407* (2013.01); *F16D 1/0858* (2013.01)

(58) Field of Classification Search
CPC .. B05B 3/1042; B05B 3/1064; B05B 5/0407; F16D 1/0858
USPC .................. 239/223, 224, 600, 699–703, 289
See application file for complete search history.

(56) References Cited

U.S. PATENT DOCUMENTS 2,296,079 A   9/1942  Anderson
3,109,672 A   11/1963 Franz
(Continued)

FOREIGN PATENT DOCUMENTS

CN   1092701 A   9/1994
CN   2496556 Y   6/2002
(Continued)

OTHER PUBLICATIONS

International Search Report, PCT/EP2010/004569, dated Jun. 12, 2010.

*Primary Examiner* — Len Tran
*Assistant Examiner* — Alexander Valvis
(74) *Attorney, Agent, or Firm* — Bejin Bieneman PLC

(57) ABSTRACT

A rotary atomizer is disclosed, comprising an atomizer bell and a shaft carrying the same. The rotary atomizer may further include a retainer between the atomizer bell and the shaft, said retainer preventing, e.g., by the action of a centrifugal force, the atomizer bell from detaching itself from the shaft.

10 Claims, 5 Drawing Sheets

(51) Int. Cl.
*B05B 5/04* (2006.01)
*F16D 1/08* (2006.01)

(56) References Cited

U.S. PATENT DOCUMENTS

| | | | |
|---|---|---|---|
| 3,633,828 A | 1/1972 | Larson | |
| 4,121,770 A | 10/1978 | Straarup | |
| 4,919,333 A | 4/1990 | Weinstein | |
| 4,943,005 A | 7/1990 | Weinstein | |
| 4,953,756 A | 9/1990 | Breault et al. | |
| 5,078,321 A | 1/1992 | Davis | |
| 5,248,341 A | 9/1993 | Berry, Jr. et al. | |
| 5,685,495 A | 11/1997 | Pham et al. | |
| 5,730,370 A | 3/1998 | Bowen | |
| 5,845,384 A | 12/1998 | Retzbach | |
| 6,514,003 B2 | 2/2003 | Horikawa | |
| 7,452,421 B2 | 11/2008 | Thome | |
| 7,455,329 B2 | 11/2008 | Muradov et al. | |
| 7,654,472 B2 | 2/2010 | Nolte | |
| 7,993,257 B2 * | 8/2011 | Simonini et al. | 494/12 |
| 2003/0230650 A1 | 12/2003 | Schaupp et al. | |
| 2004/0069877 A1 | 4/2004 | Schaupp | |
| 2005/0172892 A1 | 8/2005 | Thome et al. | |
| 2007/0063517 A1 | 3/2007 | Pallini et al. | |
| 2007/0090204 A1 | 4/2007 | Nolte et al. | |
| 2010/0282865 A1 * | 11/2010 | Yamada | 239/289 |

FOREIGN PATENT DOCUMENTS

| | | |
|---|---|---|
| CN | 1494949 A | 5/2004 |
| CN | 1496761 A | 5/2004 |
| DE | 492394 C | 2/1930 |
| DE | 1425428 A1 | 11/1968 |
| DE | 2218756 A1 | 11/1972 |
| DE | 3246446 A1 | 8/1983 |
| DE | 3434763 A1 | 1/1986 |
| DE | 3528084 A1 | 3/1986 |
| DE | 3512967 A1 | 10/1986 |
| DE | 3714148 A1 | 11/1987 |
| DE | 3716776 A1 | 12/1987 |
| DE | 3634443 A1 | 4/1988 |
| DE | 3912700 C1 | 10/1990 |
| DE | 4306799 A1 | 9/1994 |
| DE | 19521755 C1 | 10/1996 |
| DE | 19516697 A1 | 11/1996 |
| DE | 69318398 T2 | 11/1998 |
| DE | 19914343 A1 | 10/2000 |
| DE | 102004032045 A1 | 1/2006 |
| DE | 102005020623 A1 | 6/2006 |
| DE | 202006010422 U1 | 8/2006 |
| DE | 60306175 T2 | 5/2007 |
| DE | 60314417 T2 | 2/2008 |
| DE | 602004010076 T2 | 9/2008 |
| DE | 102008038760 A1 | 2/2010 |
| DE | 102010013414 A1 | 10/2011 |
| EP | 0642842 A2 | 3/1995 |
| EP | 0715896 A2 | 4/2001 |
| EP | 1157747 A2 | 11/2001 |
| EP | 1308217 A2 | 5/2003 |
| EP | 1245290 A1 | 1/2005 |
| EP | 1674161 A2 | 6/2006 |
| EP | 1266695 A1 | 3/2010 |
| FR | 2339095 A1 | 8/1977 |
| FR | 2698564 A1 | 6/1994 |
| GB | 2274495 A | 7/1994 |
| JP | H04227082 A | 8/1992 |
| JP | H08503416 A | 4/1996 |
| JP | 11028391 A | 2/1999 |
| JP | 2002166199 A | 6/2002 |
| JP | 2002224593 A | 8/2002 |
| JP | 2010517823 A | 5/2010 |
| JP | 5138035 A | 2/2013 |
| SU | 144826 A1 | 11/1960 |
| WO | WO-2005110005 A1 | 11/2005 |
| WO | WO-2005110617 A1 | 11/2005 |
| WO | WO-2008060935 A2 | 5/2008 |
| WO | WO-2010/127850 A1 | 11/2010 |

* cited by examiner

ROTARY ATOMIZER COMPRISING AN ATOMIZER BELL AND A RETAINER

CROSS-REFERENCES TO RELATED APPLICATIONS

This application is a National Stage application which claims the benefit of International Application No. PCT/EP2010/004569 filed Jul. 26, 2010, which claims priority based on German Application No. DE 10 2009 034 645.7, filed Jul. 24, 2009, and German Application No. DE 10 2010 013 414.7, filed Mar. 30, 2010 and International Application No. PCT/EP2010/002764.5, filed May 5, 2010, all of which are hereby expressly incorporated by reference in their entireties.

FIELD

The present disclosure relates to a spray body shaft, e.g., a bell cup shaft for a rotary atomiser. The present disclosure also relates to a correspondingly adapted spray body, e.g., in the form of a bell cup. Furthermore, the present disclosure relates to a throw-off securing element for throw-off securement of a spray body, e.g., in the form of a bell cup, and a correspondingly adapted spray body, onto which the throw-off securing element can be mounted, e.g., in a releasable manner.

BACKGROUND

In modern paint plants for painting motor vehicle body components rotary atomisers which have a rotating bell cup as the spray body are generally used as the application device. In general the bell cup is mounted by means of a screw-type connection to the bell cup shaft of the rotary atomiser, the releasable screw-type connection allowing the bell cup, which is regularly removed for cleaning purposes, to be replaced when it is worn. The screw-type connection also centres the bell cup in the hollow turbine shaft.

A drawback of this conventional bell cup attachment by means of a screw-type connection is the soiling tendency of the external thread of the bell cup and of the internal thread of the bell cup shaft. This is particularly problematic as cleaning these threads takes a great deal of time.

A further disadvantage of the conventional bell cup attachment is that for screwing on the bell cup at least five rotations of the bell cup relative to the bell cup shaft are typically required in order to form a strong screw connection. When replacing the bell cup for cleaning or due to wearing a respective number of rotations of the bell cup relative to the bell cup shaft is also required in order to release the bell cup from the bell cup shaft.

Moreover, with the conventional bell cup attachment by means of screwing, there is the risk of the bell cup unintentionally becoming detached in the event of sudden braking of the bell cup during blocking of the bearing unit, which given the high speeds of around 8000-80,000 revs/min achieved during operation, can be extremely dangerous.

Furthermore, soiling of the bell cup thread may lead to a mechanical imbalance which is associated with corresponding mechanical stressing of the bearing unit and in extreme cases can result in failure of the bearing unit.

Finally, with the conventional bell cup attachment by means of screwing, there is a risk of the bell cup thread becoming jammed and thereby blocked. Removal of the bell cup is then no longer possible.

Accordingly, there is a need for an improved bell cup attachment.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

DETAILED DESCRIPTION

Figure 1A:
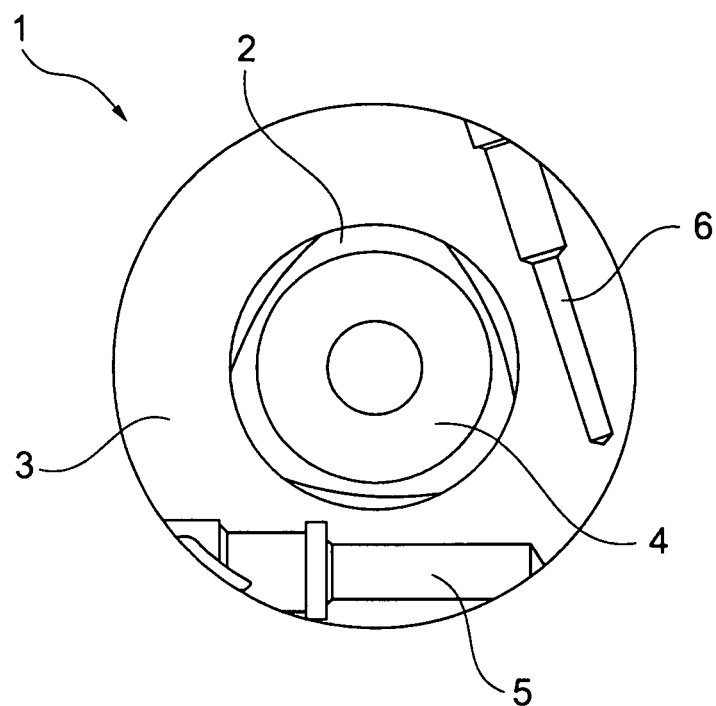
FIG. 1A shows a cross-sectional view along line A-A in FIG. 1B of a bell cup attachment according to the so-called polygonal clamping technology in accordance with an exemplary illustration.

Various exemplary illustrations are provided herein of a spray body shaft for a rotary atomiser, wherein the spray body shaft comprises a fastening device. The fastening device may comprise at least one locking or friction element on an inner contour of the spray body shaft to form a locking or friction connection with at least one complementary locking or friction element that is arranged on the mounting shaft of the spray body or on a throw-off securing element. The locking or friction connection may be created and/or strengthened during operation due to the centrifugal forces occurring during operation.

The exemplary illustrations are not necessarily restricted to examples that eliminate all the drawbacks of the prior art mentioned in the introduction. Rather, the exemplary illustrations include examples described below.

It should also be mentioned that in the following the exemplary illustrations are described specifically for a rotary atomiser which has a bell cup as spray body. However, the exemplary illustrations are also suitable for other types of rotary atomisers (e.g. disk atomisers) with other spraying bodies (e.g. rotation disks). Accordingly, the description of the exemplary illustrations herein does not limit the scope of protection to rotary atomisers with a bell cup as the spray body, but also covers in general other types of rotary atomisers.

It is possible that the spray body has, in addition to a screw connection or instead of the screw connection, a fastening device to mount, e.g., releasably, the spray body on the spray body shaft. Particularly it is possible that the spray body has, in addition to a screw connection to mount, e.g., releasably, the spray body on the spray body shaft, a fastening device.

It is possible that the spray body shaft has, in addition to a screw connection or instead of the screw connection, a fastening device to mount, e.g., releasably, the spray body on the spray body shaft. Particularly it is possible that the spray body shaft has, in addition to a screw connection to mount, e.g., releasably, the spray body on the spray body shaft, a fastening device.

In an exemplary illustration, the fastening device is provided to achieve a throw-off securement (throw-off prevention means) for the spray body.

In one example, for fastening the spray body (e.g. bell cup) to the spray body shaft (e.g. bell cup shaft), so-called polygonal clamping technology is used, e.g., as generally described in DE 195 21 755 C1 and corresponding U.S. Pat. No. 5,845,384, so that the contents of each of these publications are hereby expressly incorporated by reference in its entirety, including the description therein of the referenced polygonal clamping technology.

In this example, a spray body shaft with a clamping device for creating a clamp connection may be provided between the spray body and the spray body shaft, wherein the clamping device can be designed, for example, as described in DE 195 21 755 C1 and corresponding U.S. Pat. No. 5,845,384.

The spray body shaft in accordance with the exemplary illustrations therefore may have a hollow inner contour into which a mounting shaft of the spray body can be axially introduced in order to mount the spray body on the spray body shaft.

By means of the clamping device the inner contour of the spray body shaft is elastically deformable between a mechanically unstressed neutral position and a mechanically stressed mounting position. In the mechanically stressed mounting state the inner contour of the spray body shaft substantially corresponds with the outer contour of the mounting shaft of the spray body so that the mounting shaft of the spray body can be introduced into the inner contour of the spray body shaft. The clamping device may therefore be inserted during the mounting of the spray body in order to deform the inner contour of the spray body shaft so that the mounting shaft of the bell cup can be introduced into the spray body shaft. After introducing the mounting shaft of the bell cup the clamping device then releases the deformation force on the spray body shaft as a result of which the spray body shaft springs back elastically into its neutral state which results in a corresponding clamping connection between the inner contour of the spray body shaft and the mounting shaft of the spray body.

Typically, linear contacts are developed here between the lateral surface of the mounting shaft of the spray body on the one hand and the inner contour of the spray body shaft on the other hand.

In the exemplary illustrations, the clamping device may have a clamping bore into which a clamping screw can be screwed, wherein the inner contour of the spray body shaft is deformed from the neutral state into the mounting state when the clamping screw is screwed in. The clamping bore for accommodating the clamping screw may extend in the rotational plane of the spray body shaft and/or spaced apart from the axis of rotation.

It should also be mentioned that the inner contour of the spray body shaft in this example may be polygonal in the neutral state and substantially cylindrical in the mounting state in order to achieve a shape adaptation to the cylindrical mounting shaft of the spray body.

Moreover, the exemplary illustrations also comprise another variant of a bell cup fastening, wherein this variant partially corresponds with the bell cup fastening, for example as described in EP 1 674 161 A2, so that the contents of this publication are hereby expressly incorporated by reference in its entirety, including the description of the structural configuration of this example.

In this exemplary illustration as well, the spray body shaft has a hollow inner contour with an internal thread into which a correspondingly adapted external thread on the mounting shaft of the spray body can be screwed.

In contrast to the conventional bell cup fastenings with a screw connection, the internal thread of the spray body shaft in regard to the exemplary illustrations may widen over the length of the thread towards the spray body. In other words, the internal thread of the spray body shaft may narrow with increasing screw-in depth.

Accordingly, the mounting shaft of the spray body in this variant has several slits running axially or at a defined angle to the axis, which start from the front side of the mounting shaft and divide the mounting shaft at its distal end into several shaft sectors, which are radially pliant in order to adapt to the conically tapering internal thread of the spray body shaft. When the mounting shaft of the spray body is screwed into the conically tapering internal thread of the spray body shaft the individual shaft sectors are pressed radially inwards. Here the axially extending slits in the mounting shaft of the spray body allow the individual shaft sectors to divert radially inwards.

During the operation of a bell cup with such a bell cup fastening, the individual shaft sectors may be pressed radially outwards by the centrifugal force acting during operation and thus increase the friction and/or pretension in the screw connection and therefore also the forces, moments and thus the release work necessary for releasing the screw connection.

Due to the conically-shaped thread form in the spray body shaft, with increasing thread length an increasing gap develops between the thread outer diameter of the external thread of the mounting shaft of the spray body on the one hand and the outer diameter of the internal thread of the spray body shaft on the other hand. This provides the advantage that dirt can be diverted into this gap and thereby has no effect on the centring of the spray body, so that the holding function of the bell cup fastening is not impaired.

It should also be mentioned that the slits between the adjacent shaft sectors in the spray body according to the exemplary illustrations may in these examples be filled with an elastic and/or vibration damping material, for example an elastomer. The elastic and/or vibration damping material may be firmly attached by means of a vulcanisation process to the metallic material of the spray body, whereby micro-vibrations caused by residual imbalances are damped. Furthermore, the elastic and/or vibration damping material can be provided in order, for example, to prevent deposits of coating material or other media in the slits.

It is possible that a ring body which seals the slits is inserted on the inside of the shaft sectors. Ribs which engage in the slits may be formed on the ring body. The ring body may be made of a rubber-elastic material.

In one exemplary illustration, the internal thread of the spray body shaft has a nominal diameter, measured over the tooth tips, which is substantially constant over the length of the thread, while the core diameter, measured over the tooth valleys, increases over the length of the thread towards the spray body. This means that the connecting line of the tooth tips of the internal thread of the spray body shaft does not run parallel to the connecting line of the tooth valleys of the internal thread of the spray body shaft. Rather, the two connecting lines in this example encompass an angle which can be in the range of 0.5°-2°, merely as an example.

In another exemplary illustration, the nominal diameter and the core diameter of the internal thread of spray body shaft increases equally towards the spray body. This means that the connecting line of the tooth tips of the internal thread of the spray body shaft runs parallel to the connecting line of the tooth valleys of the internal thread of the spray body shaft. Here, the nominal diameter of the internal thread of the spray body shaft can increase constantly over the entire length of the thread at an angle, e.g., of 0.5°-1.5°, towards the spray body.

The thread may be a special thread, that, for example, has increased foot play in order to be able to receive dirt/paint residues, and/or the slits are shaped in such a way that paint pressed out of the thread can be received.

In another exemplary illustration, the bell cup fastening has a so-called centrifugal force clamping pliers means. In this variant too the spray body shaft has a hollow inner contour into which a mounting shaft of the spray body can be axially inserted in order to mount the spray body on the spray body shaft.

In an exemplary illustration, a throw-off securing element is provided for throw-off securement of a spray body (for securing the spray body against being thrown off), for example for a rotary atomiser, e.g., a spray body as disclosed herein. The throw-off securing element can particularly have, in addition to an attaching means to mount, e.g., releasably, the throw-off securing element to the spray body, a fastening device.

The fastening device of the throw-off securing element and/or of the spray body can have at least one locking or friction element to form, with at least one complementary locking or friction element on the inner contour of a rotatable spray body shaft, e.g., as disclosed herein, particularly a bell cup shaft of the rotary atomiser on which the spray body is releasably mountable, a locking or friction connection created and/or strengthened during operation due to the centrifugal force occurring during operation.

The throw-off securing element, which may be releasably mountable on the spray body, is particularly advantageous, as a defective throw-off securing element does not require complete replacement of the spray body, but only the replacement of the throw-off securing element, which in comparison with a spray body such as, for example, a bell cup can be produced considerably more cost effectively. It is also advantageous that the spray body and the throw-off securing element can be made of different materials that can meet different requirements.

It is possible that the throw-off securing element is formed integrally on the spray body.

Particularly it is possible that the at least one locking or friction element of the spray body and/or of the throw-off securing element comprises at least one elastic tongue and/or is formed as at least one elastic tongue.

It is particularly advantageous that the at least one locking or friction element may be provided on at least one elastic tongue, e.g., on the free end or at least adjacent to the free end of the at least one tongue and/or projects radially outwards.

The at least one elastic tongue may be an elastically resilient tongue.

In one exemplary illustration several, e.g., three or six, tongues and/or several, e.g., three or six, locking or friction elements are provided, wherein the tongues each have one locking or friction element.

The locking connection may be a positively locking connection.

Further, in accordance with an exemplary spray body, e.g., a bell cup, for a rotary atomiser, is provided, wherein the spray body is, for example, releasably mountable on a rotatable spray body shaft, e.g., as disclosed herein, particularly on a bell cup shaft, of the rotary atomiser. The spray body may be particularly provided to releasably mount the throw-off securing element. The spray body can, in addition to a first attaching structure to mount the spray body on the spray body shaft, have a second attaching structure to, e.g., releasably, mount the throw-off securing element. The exemplary illustrations also include the example in which the throw-off securing element is releasably mounted on the second attaching structure or is provided non-releasably and/or integrally on the spray body.

The fastening device and/or the locking or friction connection occurring and/or increased due to the centrifugal forces arising during operation may serve exclusively as a throw-off securement for the spray body and/or may be exclusively provided to prevent a throwing off of the spray body during operation, e.g. if the attaching mechanism, particularly the screw connection, between spray body shaft and the spray body fails or unintentionally becomes loosened.

It is possible that the locking or friction connection is created and/or is strengthened only in operation due to the centrifugal forces occuring during operation, while there is no locking or friction connection when the rotary atomiser, the spray body and/or the throw-off securing is in a rest state and is not rotating, respectively.

Moreover the inner contour of the spray body shaft and the mounting shaft of the spray body and the throw-off securing element, respectively may have complementary locking elements, which in the mounted state and/or only through the effect of centrifugal force form a positive locking connection between the spray body shaft and the spray body and/or the throw-off securing element.

The locking or friction element on the inner contour of the spray body shaft can, for example, comprise at least two pockets or, in one example, circular arc-shaped grooves. Particularly, two, and in some cases three, pockets or grooves can be provided. The pockets or grooves may be arranged such that in operation respectively two tongues or two locking or friction elements of the spray body or of the throw-off securing element enter in respectively one pocket or groove to form the locking or friction connection. In another example the locking or friction element on the inner contour of spray body shaft can be a circumferential groove.

It is possible that the locking or friction element on the inner contour of the spray body shaft comprises a wedge-shaped section which is particularly provided to engage behind at least one complementary locking or friction element arranged on the mounting shaft of the spray body or on the throw-off securing element for throw-off securement of the spray body.

Within the scope of the exemplary illustrations, instead of locking elements, friction elements can also be provided which form a friction connection, wherein the friction connection is strengthened by the centrifugal force occurring during operation. However, for the sake of simplicity sometimes only locking elements are discussed below.

In one exemplary illustration, the spray body shaft can have an internal thread to form a screw connection with a correspondingly adapted external thread on the mounting shaft of the spray body so that the bell cup attachment has both a screw connection and a locking connection. Here as well it is possible that the locking connection is created only through the effect of the centrifugal force occurring during operation.

The locking connection may in this example be formed such that the locking connection between the complementary locking elements of the spray body and/or of the throw-off securing elements on the one hand and the spray body shaft on the other hand only locks when the spray body and/or the throw-off securing element and the spray body shaft are in a certain axial locking position relative to each other. The screw connection between the spray body and the spray body shaft allows the spray body and/or the throw-off securing element to move axially into the locking position, without axial pressing force having to be exerted on the spray body and/or the throw-off securing element. For this it is only necessary to screw the spray body, where applicable with mounted throw-off securing element, onto the spray body shaft, wherein the spray body, together with the possibly mounted throw-off securing element, automatically moves axially into the locking position due to the thread pitch of the screw connection.

In operation of such a bell cup attachment, the locking elements on the spray body and/or the throw-off securing element may, due to the centrifugal force and/or due to their inherent elasticity, be pressed outwards against the complementary locking element on the inner contour of the spray element with a certain radial pressing on force. Here it is possible that the locking connection is structurally designed so that this radially acting pressing on force is converted due to the geometry of the locking connection into an axial attractive force, which braces the spray body and/or the throw-off securing element axially to the spray body shaft and/or designed so that through the effect of the centrifugal force on the locking noses with a correspondingly formed complementary inner contour, an axial positive locking is achieved. For example, the inner contour of the spray body shaft in the area of the locking connection can be formed such that the inner contour in this area tapers towards the spray body. If the locking elements on the spray body and/or the throw-off securing element now press against this inclined inner contour of the spray body shaft, the inclination of the inner contour creates a corresponding axial attraction force. With an inclination of the inner contour of, for example, 0°, no axial force occurs and a positive locking is produced.

In an exemplary illustration, the at least one locking element, e.g., the locking elements on the spray body and/or on the throw-off securing element, are formed as at least one elastic tongue, particularly as an elastically resilient locking tongue or locking tongues. The locking tongues on the spray body project axially from the atomiser-sided front side of the mounting shaft of the spray body. The individual locking tongues of the spray body may be distributed around the circumference of the mounting shaft of the spray body and are separated by slits running axially or at a defined angle to the axle, so that the individual locking tongues of the spray body are pressed radially outwards in operation due to the centrifugal forces occurring during operation.

The mounting shaft of the spray body may have a first attaching structure and/or the second attaching structure, wherein the first attaching structure can be a first thread and the second attaching structure can be a second thread, which may be arranged coaxially with respect to each other. Particularly, the first thread can be an external thread to form a screw connection with a correspondingly adapted internal thread on the hollow inner contour of the spray body shaft. Further, the second thread can also be particularly an external thread to form a screw connection with a correspondingly adapted internal thread on the throw-off securing element.

Although the herein described connection mechanisms for releasable connection may be thread-type connections, other connection mechanisms, such as locking, snap-in and/or clamp connections or other releasable connection mechanisms can be used to releasably mount the spray body, the spray body shaft and/or the throw-off securing element to one another.

Particularly the attaching means of the throw-off securing element and the second attaching structure of the spray body may be provided to be releasably mountable to one another, e.g., by means of a screw connection. The attaching means may be an internal thread and the second attaching structure an external thread.

It is possible that the at least one tongue of the throw-off securing element projects substantially axially from a front side of a base part of the throw-off securing element. Particularly the tongues can be arranged around the circumference of the base part and/or be separated from each other by intermediate spaces or slits.

In one example, the intermediate spaces or slits between the tongues of the throw-off securing element can be vulcanised for example, particularly be filled with an elastic and/or vibration damping material, for instance with an elastomer. The elastic and/or vibration damping material may be firmly connected to the throw-off securing element, e.g., by a vulcanisation process, particularly to the tongues.

It is possible that the at least one tongue is pressed, for example, radially outwards during operation due to the centrifugal forces occurring during operation.

It may be advantageous that the locking or friction connection be configured such that it will release with decreasing centrifugal force and/or is released in the absence of centrifugal force, e.g. when the rotary atomiser, the spray body and/or the spray body shaft is in the rest state and is not rotating, respectively.

Particularly it is possible that in the rest state and/or in the absence of centrifugal force the at least one tongue and/or the locking element of the spray body and/or of the throw-off securing element does not project into the complementary locking element on the inner contour of the spray body shaft, particularly that the tongue and/or the locking element of the spray body and/or of the throw-off securing element and the spray body shaft, particularly the complementary locking element on the inner contour of the spray body shaft, do not contact each other.

In one exemplary illustration, in the rest state and/or in the absence of centrifugal force particularly, there is no mechanical connection and/or no touching contact between the spray body shaft, particularly the inner contour thereof, and the throw-off securing element.

It is possible that the at least one tongue has at its free end or at least close to its free end a projection disposed radially inwards and/or in the circumferential direction to increase the weight in the area of the free end as a result of which the effect of the centrifugal force can be increased during operation.

The base part may be a ring part and can, for example, connect several tongues to one another.

It is possible that the attaching means of the throw-off securing element is provided on a circumferential projection projecting substantially axially from the base part or on several projections distributed around the circumference of the base part and separated from each other by intermediate spaces. The at least one tongue of the throw-off securing element and the at least one projection may extend from the base part in opposite directions.

It is possible that the at least one tongue has a locking or friction element that projects, e.g., radially outwards and is arranged on the free end or at least near the free end of the tongue, particularly to be able to form a stop in the axial direction and/or in the circumferential direction.

As has been mentioned the locking or friction element on the inner contour of the spray body shaft may be designed in the form of two or more, and in one example three pockets, more particularly in the form of non-circumferential, circular arc-shaped grooves. The pockets or grooves may be provided to form a complementary stop in the axial direction and/or the circumferential direction for the at least one complementary locking or friction element of the spray body or of the throw-off securing element.

Particularly it is possible that the at least one tongue and/or the at least one locking or friction element comprises a wedge-shaped section that may be provided to engage behind at least one complementary locking or friction element on the inner contour of the rotatable spray body shaft.

The throw-off securing element may be formed substantially tubular and/or have a substantially circular lateral surface.

In one example, the locking or friction element and/or the at least one tongue can project at its free end or at least near its free end outwards over the circular lateral surface of the throw-off securing element.

It is possible that at least one tongue extends substantially in the circumferential direction of the throw-off securing element and/or circular arc shaped.

The extent of the at least one tongue in the circumferential direction of the throw-off securing element may be greater than in the axial direction of the throw-off securing element.

It is also possible that the at least one tongue and/or the at least one locking or friction element extends in a plane substantially perpendicular to the middle axis of the throw-off securing element.

It is also possible that the at least one tongue projects at a defined angle on or in the circular lateral surface of the throw-off securing element.

The middle axis, the axial direction and/or the circumferential direction relates to the spray body, the spray body shaft and/or the throw-off securing element. Normally the spray body, the spray body shaft and/or the throw-off securing element are arranged coaxially to each other so that the middle axes, axial directions and/or circumferential directions correspond to each other or are coaxial to each other.

Furthermore, the at least one tongue can, at least partially, e.g., substantially over its entire longitudinal extent, extend in the circular lateral surface of the throw-off securing element, and/or at least partially be received by the circular lateral surface of the throw-off securing element, while the at least one locking or friction element can project outwards, e.g., radially, over the circular lateral surface.

It is possible that the at least one tongue is formed by slits in the circular lateral surface of the throw-off securing element.

The slits can be arranged substantially U-shaped on the circular lateral surface.

The at least one tongue may comprise a free end and a supported end in a plane substantially perpendicular to the middle axis. Particularly, the supported end and the free end may be spaced apart from one another in the circumferential direction of the throw-off securing element.

It is possible that the supported end is a section of the circular lateral surface of the throw-off securing element extending over the axial direction of throw-off securing element, which, for example, can substantially be straight, curved or approximately U-shaped.

The at least one tongue and/or the at least one locking or friction element can be provided to be moved during operation, due to the centrifugal forces occurring during operation, substantially spiral arm shaped and/or substantially circular arc-shaped, e.g., radially outwards from the lateral surface of the throw-off securing element and/or to project in this manner.

The tongues may be separated from each other by the circular lateral surface of the throw-off securing element and/or are received in recesses in the circular lateral surface of the throw-off securing element.

The tongues and/or the locking or friction elements may be arranged over the circumference of the circular lateral surface of the throw-off securing element and/or arranged in a plane substantially perpendicular to the middle axis of the throw-off securing element.

The throw-off securing element can in an end area or close to an end area have a circumferential collar projecting, for example, radially outwards, which, in particular is provided to serve as a stop for a broken off tongue or a broken off locking or friction element, whereby it is preventable, for example, that they come into contact with a rotating part, particularly parts rotating relative to each other (e.g., color tube and spray body shaft and turbine shaft, respectively) which could lead to jamming or to other undesirable effects.

It is also possible that the throw-off securing element comprises a ring body provided to be arranged on the inside of the throw-off securing element and/or to serve as a stop for a broken off tongue or a broken off locking or friction element, whereby it is preventable, for example, that they come into contact with a rotating part (e.g. spray body and spray body shaft and turbine shaft, respectively) which could lead to jamming or to other undesirable effects.

The ring body can be made of plastic and/or an elastic and/or vibration damping material. The ring body may be inserted on the inside of the slits of the ring-shaped lateral surface of the throw-off securing elements.

The at least one (complementary) locking or friction element of the spray body and/or of the throw-off securing element and the at least one complementary locking or friction element on the inner contour of the spray body shaft may create a positive locking connection which can, in particular, act in the axial direction and/or the circumferential direction.

If the locking or friction element on the inner contour of the spray body shaft is provided in the form of a circumferential groove, the stop in the circumferential direction may be omitted and the stop in the axial direction remains, whereby a locking connection can only be produced in the axial direction.

In one exemplary illustration, the throw-off securing element, particularly the at least one tongue and/or the at least one locking or friction element, is made of plastic or metal. It is possible that at least a part of the remaining spray body and/or the spray body as such, particularly a bell cup, or the substantially entire remaining part of the spray body is made of, for example, a different metal (e.g. titanium).

The throw-off securing element and the spray body may be made of different materials to meet different requirements. On the one hand it is advantageous, for example, for the bell cup per se to be made of metal, particularly titanium. However for the tongues, titanium tends to be disadvantageous due to the low strength.

Finally the exemplary illustrations also comprise another variant of a bell cup attachment in which the spray body is attached to a central clamping screw on the spray body shaft. The central clamping screw may be passed through a central bore in the bell cup and screwed with an internal thread of the spray body shaft. In this variant the spray body in accordance with the exemplary illustrations has an axial stop on which the clamping screw can be supported to clamp the spray body to the spray body shaft in the axial direction.

Moreover, in this variant of a bell cup attachment a rotation securement may be provided which connects the spray body with the spray body shaft in a manner secured against rotation. The rotation securement may be a pin connection with an axially extending pin on one part and an axially extending receiving bore for the pin in the other part, wherein in the mounted state the pin on the one part engages in the receiving bore in the other part and prevents rotation. Several such pin connections may be distributed around the circumference in a rotationally symmetrical manner to avoid an imbalance.

The threads (particularly internal and external threads), screw-type connections, screw connections etc. mentioned in the present description and/or claims can particularly be threads with a special configuration, for example as described in the documents DE 10 2010 013 414 and PCT/EP2010/002764, so that the content of these documents is assigned in full to the present description with regard to the design of the threads, screw-type connections, screw connections etc.

It should also be mentioned that the exemplary illustrations are not restricted to the above-described spray body and the also above-described spray body shaft or the throw-off securing element as individual components. Rather, the exemplary illustrations also include a spray body, e.g., with a releasably mounted throw-off securing element, and a novel rotary atomiser with such a spray body and/or such a spray body shaft.

Finally, the exemplary illustrations also comprise a painting installation with at least one such rotary atomiser, which may be guided by a multiple axle painting robot.

Figure 1B:
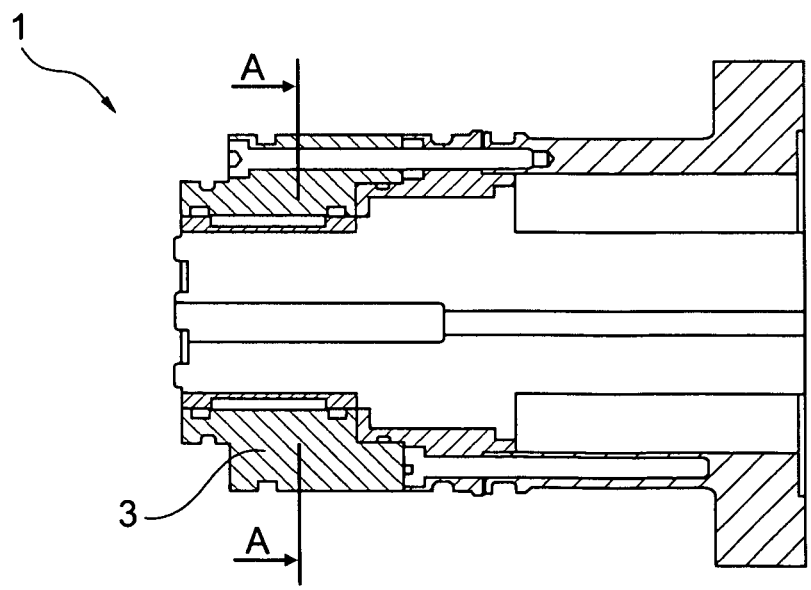
FIG. 1B shows a longitudinal section of the bell cup attachment in accordance with the example shown in FIG. 1A.

FIGS. 1A and 1B show a bell cup attachment 1 in accordance with one exemplary illustration for attaching a bell cup to a rotary atomiser, for the sake of simplicity neither the bell cup nor the rotary atomiser being shown.

The bell cup attachment 1 may operate according to the so-called polygonal clamping technology, for example as described in DE 195 21 755 C1 and corresponding U.S. Pat. No. 5,845, that the contents of these documents are hereby expressly incorporated by reference in their entireties, including the description therein regarding the structure and function of the polygonal clamping technology.

In this exemplary illustration, the bell cup attachment 1 has a rotatable, hollow bell cup shaft 2, which can be driven in a conventional manner by a turbine, which for the sake of simplicity is not however shown here. In order to avoid misunderstandings, it is pointed out that the bell cup shaft 2 is the output shaft of the bearing unit of the turbine and not a shaft formed on the bell cup.

The rotatable bell cup shaft 2 may be surrounded by a fixed clamping sleeve 3 which allows the bell cup shaft 2 to be elastically deformed in order to mount and/or replace a bell cup. Thus, in a mechanically unstressed neutral state the bell cup shaft 2 has a polygonal internal contour, whereas the bell cup to be mounted has a mounting shaft 4 with a cylindrical outer cross-section. In the mechanically unstressed neutral state the mounting shaft 4 of the bell cup cannot therefore be inserted into the bell cup shaft 2 as the bell cup shaft 2 then does not have a cylindrical internal cross-section. To mount the bell cup and to replace the bell cup, the bell cup shaft 2 therefore may have to be temporarily deformed in such a way that the bell cup shaft 2 has a cylindrical internal cross-section. To this end in the clamping sleeve 3 there is/are one or more clamping bores 5, 6 into each of which a clamping screw can be screwed in order to increase the pressure on the hydraulic medium between the clamping sleeve 3 and the bell cup shaft 2 and thereby, after overcoming the deformation resistance of the clamping sleeve 3, to deform the bell cup shaft 2 accordingly.

After insertion of the mounting shaft 4 of the bell cup into the bell cup shaft 2, the clamping sleeve 3 may be loosened again by means of the clamping screws inserted into the clamping bore 5, 6, whereupon the bell cup shaft 2 elastically springs back into its original shape with a polygonal internal cross-section. Between the inner contour of the bell cup shaft 2 and the lateral surface of the mounting shaft 4 of the bell cup a clamp connection is created due to the inherent elasticity of the bell cup shaft 2.

Figure 2:
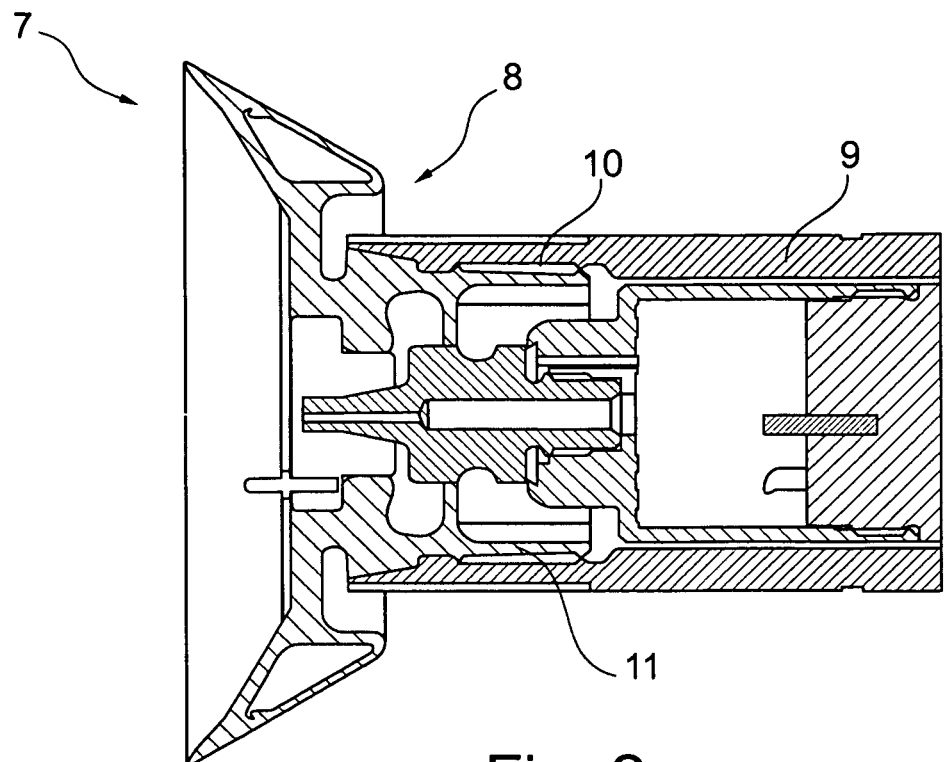
FIG. 2 shows a longitudinal section of an exemplary rotary atomiser with a bell cup attachment with a conical internal thread in the bell cup shaft.

FIG. 2 shows an alternative exemplary illustration of a rotary atomiser 7 with a bell cup 8 which is attached to a bell cup shaft 9 of the rotary atomiser 7 by means of a novel bell cup attachment.

The bell cup attachment in accordance with FIG. 2 corresponds partially to the bell cup attachment in accordance with EP 1 674 161 A2 so that the content of this document is hereby expressly incorporated by reference in its entirety, including the description therein of the structural design and function of the bell cup attachment.

A special feature of this exemplary illustration is that at its distal end the bell cup shaft 9 has an internal thread, which widens conically towards the bell cup 8. In this exemplary illustration the cone angle of the internal thread 10 in the bell cup shaft 9 is 1.5°, but other cone angles are also possible within the context of the exemplary illustrations.

In a corresponding manner the bell cup 8 has a mounting shaft 11, which carries an external thread, which can be screwed into the conical internal thread 10 of the bell cup shaft 9. The mounting shaft 11 of the bell cup 8 is hollow and has slits extending axially or inclined at an angle to the axis which start from the atomiser-sided end of the mounting shaft 11 and allow the individual shaft sectors of the mounting shaft 11 to yield radially inwards when screwing into the conical internal thread 10 of the bell cup shaft 9.

During the operation of the rotary atomiser 7, due to the centrifugal force occurring during operation, the individual shaft sectors of the mounting shaft 11 of the bell cup 8 are pressed radially outwards with a rotational speed-dependent pressing on force. The pressing on force of the shaft sectors increases the thread friction and thus also the force required to release the screw connection. This advantageously prevents the bell cup 8 coming loose during operation, which could happen, for example, in the event of sudden braking of the bell cup 8.

Figure 3:
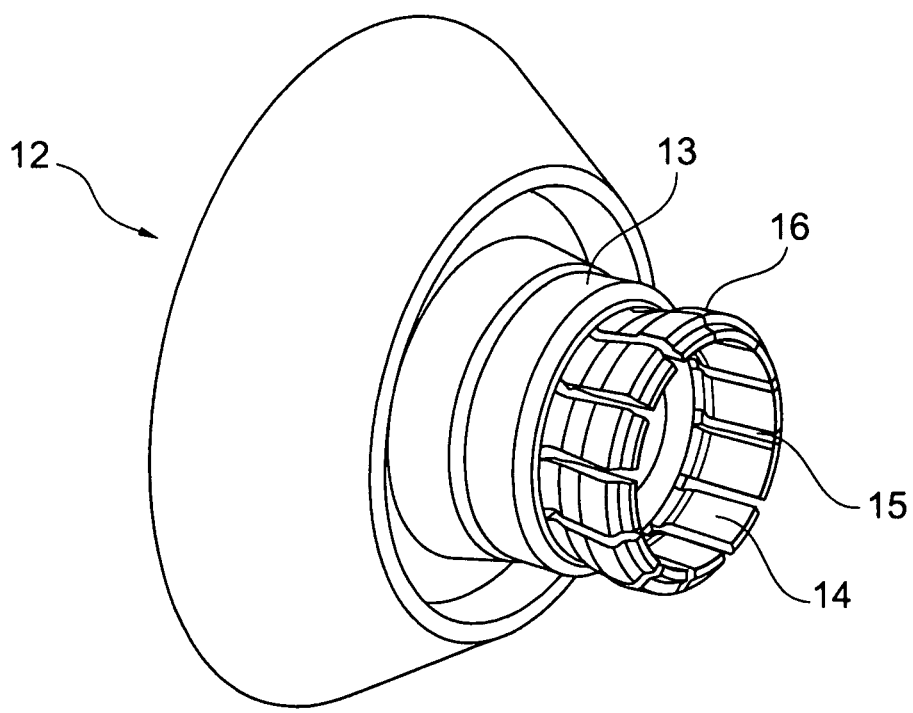
FIG. 3 shows a perspective view of an exemplary bell cup with a so-called centrifugal force clamping pliers means for fastening the bell cup.

FIG. 3 shows a bell cup 12 in accordance with the exemplary illustrations with a so-called centrifugal force clamping pliers means for fastening the bell cup 12 to a hollow bell cup shaft of a rotary atomiser, for the sake of simplicity the rotary atomiser and the bell cup shaft not being shown.

For fastening the bell cup 12 to the bell cup shaft the bell cup 12 has a cylindrical mounting shaft with an external thread 13, the external thread 13 being screwed into a correspondingly adapted internal thread of the hollow bell cup shaft during mounting of the bell cup 12.

Furthermore, for fastening to the bell cup shaft, the bell cup 12 may have, at the distal end of its mounting shaft, a plurality of axially projecting locking tongues 14, which are arranged ring-shaped around the circumference and are each separated from one another by vulcanised slits 15. The slits 15 allow the individual locking tongues 14 to spring inwards and outwards in order to form a locking connection.

For this the locking tongues 14 each have a locking element 16 on their outer lateral surface, which in the mounted state forms a locking connection with a complementary locking element on the inner wall of the bell cup shaft. For this, on its inner wall the bell cup shaft has an axial undercut in which the locking elements 16 engage behind and thereby form the locking connection.

A precondition for locking the locking connection may be that the individual locking elements 16 of the locking tongues 14 are in a certain locking position relative to the complementary locking elements on the inner wall of the bell cup shaft and/or only engage through the effect of centrifugal force. The axial movement of the bell cup 12 relative to the bell cup shaft required for this can be realized by screwing on, without an axial pressing force having to be exerted on the bell cup 12. The screw connection with the external thread 13 does not therefore only serve for generating a secure connection between the bell cup 12 and the bell cup shaft, but also facilitates producing the locking connection.

In accordance with another exemplary illustration a ring body can be inserted into the cylindrical inner space of the slit mounting shaft, the cylindrical lateral surface of which closely fits the cylindrical inner wall of the mounting shaft and thereby seals the slits 15 towards the inside. The ring body may be made of a rubber elastic material for this purpose.

In accordance with another exemplary illustration, which is not specifically shown in the figures, it is possible that the slits 15 between the adjacent shaft sectors can be filled with an elastic and/or vibration damping material, for example an elastomer, wherein the ring body can, but does not have to be, dispensed with.

Figure 6:
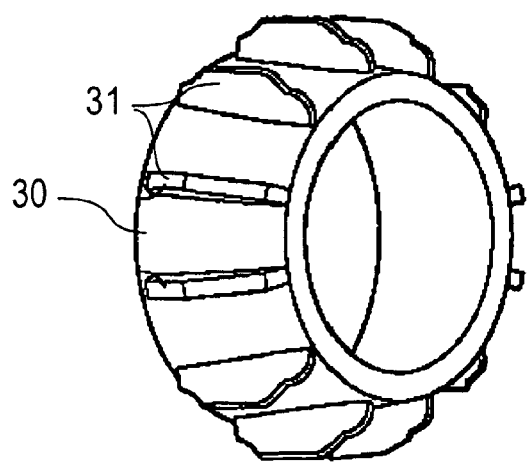
FIG. 6 shows a perspective view of a ring body in accordance with an exemplary illustration.

FIG. 6 shows a ring body 30, on which radially projecting flat ribs 31 are formed, which can be dimensioned and arranged so that they can engage into the slits 15 and can completely fill at least their radial inner sections. The ring body 30 can be substantially cylindrical or tapered. The ribs 31 are optional.

Figure 4:
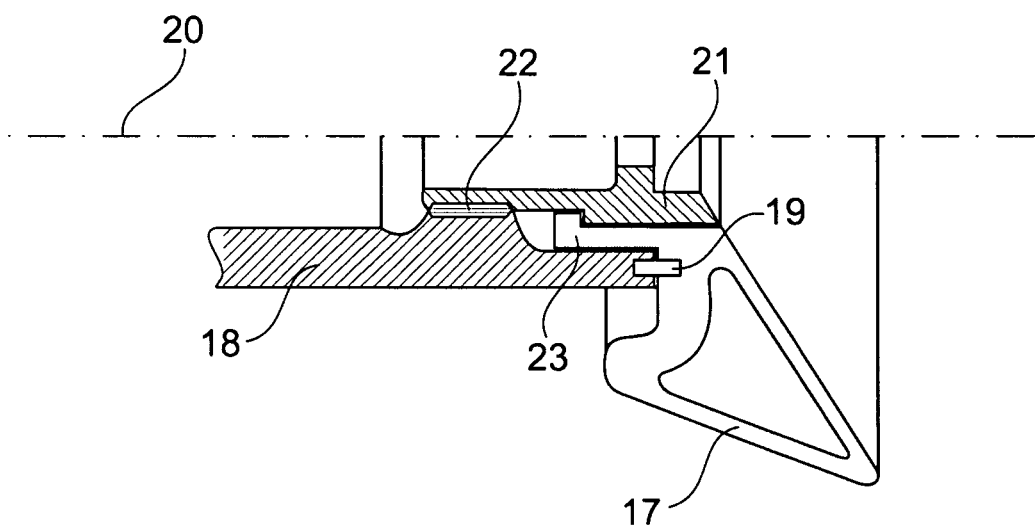
FIG. 4 shows a longitudinal section through a bell cup attachment with a central clamping screw.

FIG. 4 shows another variant of a bell cup attachment in accordance with an exemplary illustration for fastening a bell cup 17 to a hollow bell cup shaft 18.

On the one hand the bell cup attachment in this example may have a pin connection 19 to connect the bell cup 17 to the bell cup shaft 18 in a manner secured against rotation. The pin connection 19 respectively consists of a dowel pin, which is arranged in the front side of the bell cup shaft 18 and projects axially, as well as a corresponding axially extending receiving bore in the bell cup 17. A plurality of such pin connections 19 are arranged around the circumference in a rotationally symmetrical manner with regard to a rotating axis 20 in order to avoid an imbalance.

On the other hand, the bell cup attachment in this exemplary illustration has a central clamping screw 21, which is passed axially through a central bore in the bell cup 17 and in the mounted state is connected to the bell cup shaft 18 by means of a screw connection 22. The screw connection 22 consists of an external thread on the lateral surface of the clamping screw 21 and a correspondingly adapted internal thread on the inner wall of the bell cup shaft 18.

The clamping screw 21 supports on an axial stop 23 on the bell cup 17, so that the clamping screw 21 axially clamps the bell cup 17 to the bell cup shaft 18.

Furthermore, the clamping screw 21 also serves for fastening a distributor disk, which, however, is not shown here for the sake of simplicity.

Figure 5:
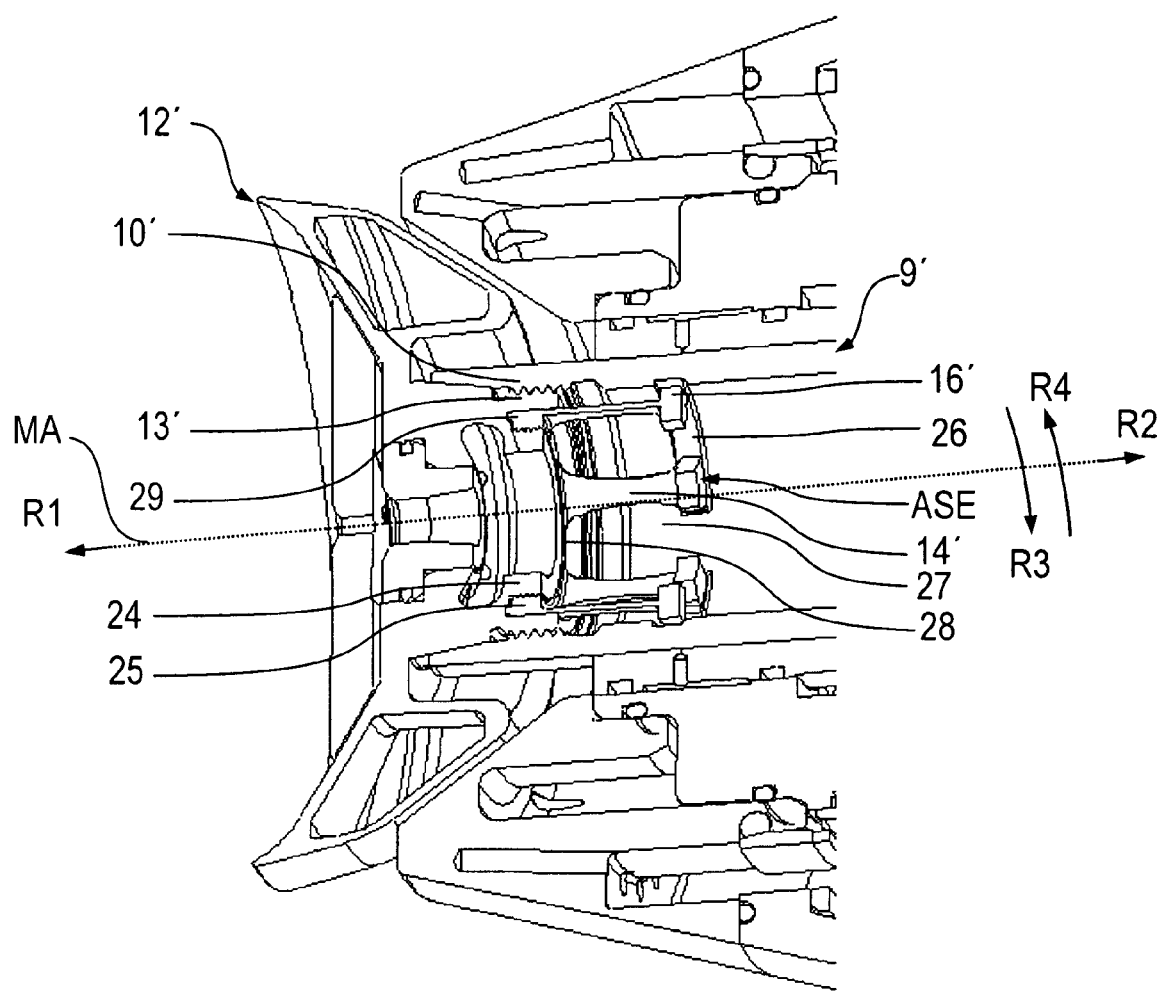
FIG. 5 shows a perspective sectional view of a different bell cup shaft, a different bell cup and a throw-off securing element in accordance with an exemplary illustration.

FIG. 5 shows a perspective sectional view in accordance with another exemplary illustration of a different bell cup shaft 9', a different bell cup 12' and a throw-off securing element ASE for throw-off securement of the bell cup 12' (for securing the bell cup against being thrown off). The exemplary illustration according to FIG. 5 corresponds in parts with the previously described examples, particularly the example illustrated in FIG. 3, wherein similar or identical parts are denoted with the same reference sign, but with the addition of an apostrophe, and for an explanation of which reference is made to the description of the previously described examples in order to avoid repetitions. Reference signs R1 and R2, respectively denote the axial direction and reference signs R3 and R4, respectively the circumferential direction of the bell cup shaft 9', of the bell cup 12' and/or of the throw-off securing element ASE.

A special feature of the example shown in FIG. 5 is the throw-off securing element ASE for throw off securement of the bell cup 12', wherein the throw-off securing element ASE comprises a fastening device and operates on the principle of a centrifugal force clamping pliers means, and a bell cup 12' adapted to releasably mount the throw-off securing element ASE.

The bell cup 12' comprises, in addition to a first attaching structure in the form of a first external thread 13' to releasably mount the bell cup 12' on the bell cup shaft 9', a second attaching structure in the form of a second external thread 24 to releasably mount the throw-off securing element ASE. The first external thread 13' and the second external thread 24 of the bell cup 12' are arranged coaxially to each other on the mounting shaft of the bell cup 12', the first external thread 13' having a larger radius than the second external thread 24.

The external thread 13' of the bell cup 12' is provided for being screwed onto a correspondingly adapted internal thread 10' on the inner contour of the bell cup shaft 9'.

The throw-off securing element ASE comprises an attaching means in the form of an internal thread 25 which can be screwed onto the second external thread 24 of the bell cup 12'.

The throw-off securing element ASE or its fastening device comprises six locking or friction elements 16', which are provided on six elastic tongues 14' (of which four can be seen in FIG. 5). The tongues 14' are separated from one another by means of intermediate spaces 27. The tongues 14' and/or the locking or friction elements 16' are provided to move radially outwards during operation of the rotary atomiser under corresponding centrifugal force, and radially inwards as the centrifugal force decreases, whereby a locking connection can be created and released.

Particularly, the locking elements 16' are arranged on or near the free end of the tongues 14' and project radially outwards. The locking elements 16' are provided to form, during operation of the rotary atomiser, a locking connection with a respective complementary locking element on the inner contour of the bell cup shaft 9' under the effect of the centrifugal force, which can be released again when the centrifugal force decreases or is absent.

In the rest state of the rotary atomiser or in the absence of centrifugal force, the tongues 14' and/or the locking elements 16' of the throw-off securing element ASE do not engage in the complementary locking element on the inner contour of the bell cup shaft 9'. Particularly there is no contact between the throw-off securing element ASE and the bell cup shaft 9'.

The tongues 14' also have at their free ends projections arranged radially inwards and in the circumferential direction of the throw-off securing element ASE, whereby the weight in the area of the free ends of the tongues 14' can be increased which advantageously influences the effect of the centrifugal force.

The complementary locking element on the inner contour of the bell cup shaft 9' comprises three circular arc-shaped grooves 26, wherein during operation of the rotary atomiser respectively two tongues 14' and/or two locking or friction elements 16' of the throw-off securing element ASE enter one circular arc-shaped groove 26, whereby a locking connection can be created.

The tongues 14' may project substantially axially from a front side of a base part 28 that connects the tongues 14' and is designed as a ring part. The tongues 14' are distributed over the circumference of the base part 28 and are separated from one another by the intermediate spaces 27.

The throw-off securing element ASE also comprises a projection 29 which projects substantially axially from the base part 28 and which circumferentially extends on the base part 28. The projection 29 does not have to be circumferential, but can also comprise several projections distributed around the base part 28 and/or separated by intermediate spaces. The internal thread 25 of the throw-off securing element ASE is arranged on the inner contour of the projection 29. The tongues 14' and the projection 29 extend in opposite directions from the base part 28.

A further special feature of the exemplary illustration shown in FIG. 5 is that the throw-off securing element ASE is made of plastic or a metal that is different from that of the bell cup 12'. The bell cup 12' is made of titanium.

Figure 7:
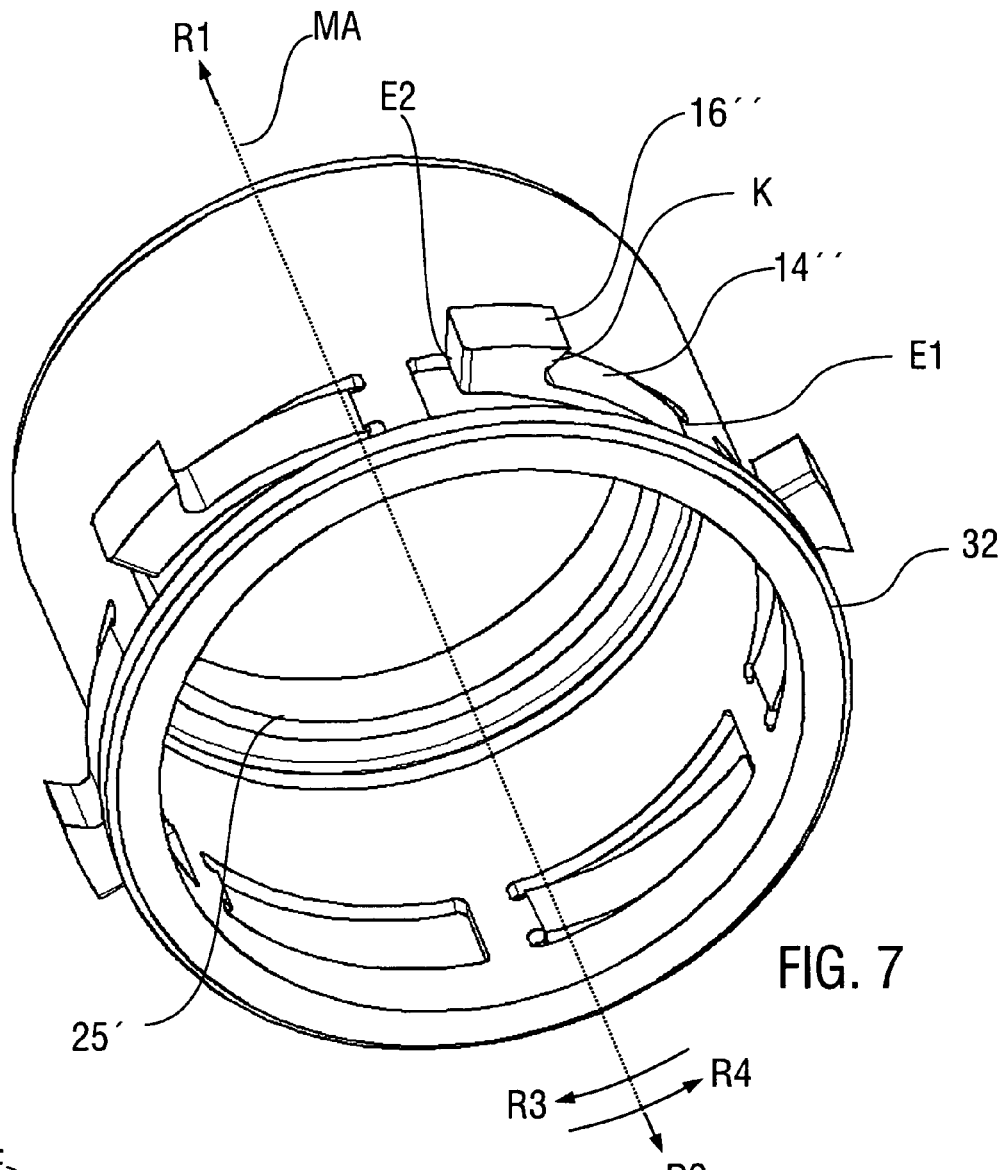
FIG. 7 shows a perspective view of a different throw-off securing element in accordance with an exemplary illustration.

FIG. 7 shows a different throw-off securing element ASE' in accordance with an exemplary illustration. The throw-off securing element in accordance with FIG. 7 can be used in place of the throw-off securing element ASE shown in FIG. 5. The examples in accordance with FIG. 7 partially corresponds with the examples described above, particularly the examples in accordance with FIG. 5, wherein similar or identical parts are given the same reference sign, but with the addition of an apostrophe, and for an explanation of which reference is made to the description of the examples described above in order to avoid repetitions.

Figure 8:
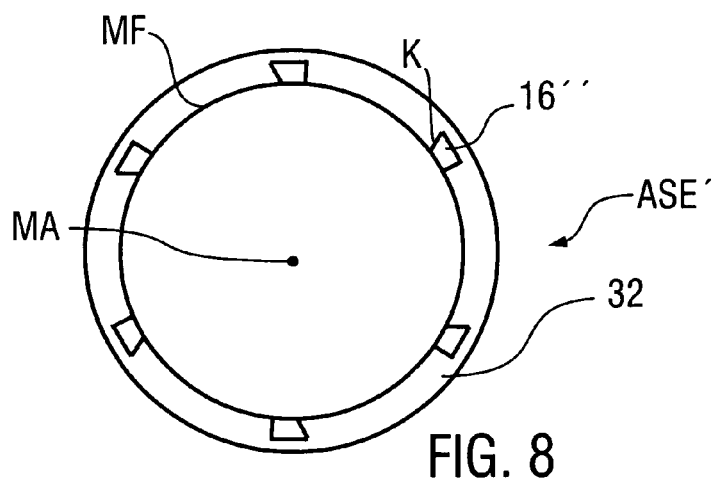
FIG. 8 shows a front view of the exemplary throw-off securing element in accordance with FIG. 7.

FIG. 7 is a perspective view of the throw-off securing element ASE' and FIG. 8 is a front view of the throw-off securing element ASE'. FIG. 7 shows the throw-off securing element ASE' under the effect of centrifugal force and FIG. 8 shows the throw-off securing element ASE' without the effect of centrifugal force. Reference sign MA denotes the middle axis, R1 and R2, respectively the axial direction and R3 and R4, respectively the circumferential direction of the throw-off securing element ASE'.

The throw-off securing element ASE' may be substantially tubular and may have a circular lateral surface MF. The throw-off securing element ASE' has an attachment means in the form of an internal thread 25', which can be screwed onto the second external thread 24 of the bell cup 12', and a fastening device.

The fastening device may comprise six locking or friction elements (and in one known example, comprises three) 16", which are arranged on six (or, in one known example, three) elastic tongues 14". The six locking or friction elements 16" are provided to form, with the complementary locking or friction elements 26 on the inner contour of the rotatable bell cup shaft 9', a locking or friction connection which is created during operation due to the centrifugal force occurring during operation. The locking or friction connection can act in the axial and/or circumferential direction.

In the absence of centrifugal force the locking or friction connection is released, wherein there is in particular no contact between the locking or friction elements 26 on the inner contour of the bell cup shaft 9' and the locking or friction elements 16" of the throw-off securing elements ASE'.

Respectively one locking or friction element 16" is arranged on or at least close to the free end of a tongue 14" and projects radially outwards. The locking or friction elements 16" has a wedge-shaped section K to engage behind a corresponding wedge-shaped section on the complementary locking or friction element 26 on the inner contour of the rotatable bell cup shaft 9.

The tongues 14" extend in the circumferential direction of the throw-off securing element ASE' and are circular arc-shaped. Particularly, the tongues 14" and the locking or friction elements 16" are arranged in a plane perpendicular to the middle axis MA of the throw-off securing element ASE'. Each tongue 14" has a free end E2 and a supported end E1, which are also arranged in a plane substantially perpendicular to the middle axis MA and are spaced apart from one another in the circumferential direction. The supported end E1 is formed by an axially extending section of the circular lateral surface MF of the throw-off securing elements ASE'.

FIG. 7 shows how the tongues 14" and/or the locking or friction elements 16" move radially outwards in operation due to the centrifugal forces occurring in operation. As can be seen, the tongues 14" are provided to move and/or to project, during operation, substantially spiral arm shaped and/or substantially circular arc shaped outwards from the circular lateral surface MF of the throw-off securing element ASE' due to the centrifugal forces occurring during operation.

As can be seen in FIG. 8, in the absence of centrifugal force, the tongues 14" are received in the circular lateral surface MF of the throw-off securing element ASE' while the locking or friction elements 16" project radially outwards from the circular lateral surface MF of the throw-off securing element ASE'.

A comparison of FIGS. 7 and 8 shows that the tongues 14" are provided to be moved, during operation, outwards from the circular lateral surface MF of the throw-off securing element ASE' due to the centrifugal force occurring during operation, and with decreasing or absent centrifugal force to return into the circular lateral surface MF of the throw-off securing element ASE'.

The tongues 14" are formed by slits in the circular lateral surface MF of the throw-off securing element ASE', while separated from each other by the circular lateral surface MF of the throw-off securing elements ASE', as can be seen in particular in FIG. 7.

The throw-off securing element ASE' further comprises in an end area or close to an end area a circumferential collar 32 projecting radially outwards, which serves as a stop for broken off tongues 14" in order to prevent them entering between a paint tube and the bell cup shaft 9'. In the interior of the throw-off securing element ASE' a ring body in accordance with FIG. 6, but, for example, without ribs 31, can be inserted in order to prevent broken off tongues 14" coming into contact with a rotating part (e.g. spray body shaft 9' or bell cup 12').

The exemplary illustrations are not limited to the previously described examples. Rather, a plurality of variants and modifications are possible, which also make use of the ideas of the exemplary illustrations and therefore fall within the protective scope. Furthermore the exemplary illustrations also include other useful features, e.g., as described in the subject-matter of the dependent claims independently of the features of the other claims.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

LIST OF REFERENCE SIGNS

1 Bell cup attachment
2 Bell cup shaft
3 Clamping sleeve
4 Mounting shaft of the bell cup
5 Clamping bore
6 Clamping bore
7 Rotary atomiser
8 Bell cup
9, 9' Bell cup shaft of the bearing unit
10, 10' Internal thread
11 Mounting shaft of the bell cup
12, 12' Bell cup
13, 13' External thread
14, 14', 14" Locking tongues
15 Slits
16, 16', 16" Locking element
17 Bell cup
18 Bell cup shaft
19 Pin connection
20 Rotating axis
21 Clamping screw
22 Screw connection
23 Stop
24 External thread
25, 25' Internal thread
26 Grooves/pockets
27 Intermediate spaces
28 Base part
29 Projection
30 Ring body
31 Ribs
32 Circumferential collar
R1, R2 Axial direction(s)
R3, R4 Circumferential direction(s)
MA Middle axis
K Wedge-shaped section
ASE, ASE' Throw-off securing element
MF Lateral surface
E1, E2 Supported end, free end

The invention claimed is:

1. A spray body that is mountable on a rotatable spray body shaft of a rotary atomizer, the spray body comprising:
   a screw connection to mount the spray body on the spray body shaft; and
   a fastening device,
   wherein the fastening device comprises a plurality of holding elements, each being arranged on a common circumference of the fastening device to form a connection with a respective one of a plurality of complementary second holding elements on an inner contour of the spray body shaft, the connection being a locking or friction connection;
   wherein each of the holding elements is a tongue having a length and a width, the length being greater than the width and extending along the common circumference on the fastening device; and
   further whereby the tongue is elastically deformable upon rotation of the rotatable spray body shaft to form the connection to the inner contour of the spray body shaft.

2. The spray body in accordance with claim 1,
   wherein the spray body has a mounting shaft which in the mounted state is introduced into the hollow inner contour of the spray body shaft.

3. The spray body in accordance with claim 2,
   wherein the mounting shaft has the first attaching structure and the second attaching structure.

4. The spray body in accordance with claim 2, wherein the first attaching structure is a first thread and the second attaching structure is a second thread, and wherein the first thread and the second thread are arranged coaxially to each other.

5. The spray body in accordance with claim 4, wherein the first thread is an external thread to form a screw connection with a correspondingly adapted internal thread on the hollow inner contour of the spray body shaft, and the second thread is an external thread to form a screw connection with a correspondingly adapted internal thread on the throw-off securing element.

6. The spray body in accordance with claim 1, wherein the second holding elements are provided on a mounting shaft of the spray body.

7. The spray body in accordance with claim 1, wherein the connection is provided to be released in an absence of centrifugal force.

8. The spray body in accordance with claim 1, wherein the at least one tongue is substantially arc-shaped.

9. The spray body in accordance with claim 1, wherein the connection is at least one of created and formed in operation due to centrifugal forces occurring during operation.

10. A spray body for a rotary atomiser, wherein the spray body is mountable on a rotatable spray body shaft of the rotary atomiser, the spray body comprising:

a first attaching structure to mount the spray body on the spray body shaft; and a second attaching structure to mount a throw-off securing element for throw-off securement of the spray body, the throw-off securing element comprising a fastening device;

wherein the fastening device comprises a plurality of holding elements, each being arranged on a common circumference of the fastening device to form a connection with a respective one of a plurality of complementary second holding elements on an inner contour of the spray body shaft, the connection being a locking or friction connection;

wherein each of the holding elements is a tongue having a length and a width, the length being greater than the width and extending along the common circumference on the fastening device; and further whereby the tongue is elastically deformable upon rotation of the rotatable spray body shaft to form the connection to the inner contour of the spray body shaft.

* * * * *